Patented June 6, 1939

2,160,867

UNITED STATES PATENT OFFICE 2,160,867

PROCESS FOR THE PRODUCTION OF THIAZOLES

Otto Hromatka, Darmstadt, Germany, assignor to Merck & Co. Inc., Rahway, N. J., a corporation of New Jersey No Drawing. Application September 23, 1937, Serial No. 165,413. In Germany September 26, 1936

5 Claims. (Cl. 260—251)

By a method first described by Hantzsch (Ann. d. Chem. Vol. 250 (1889) page 257–280) it is possible to produce thiazoles which are important for the production of certain dye stuffs and medicinal chemicals, by letting thioamides react with α-halogen-oxo-compounds. However, the thioamides which are used for this purpose are very difficultly obtainable and can be produced only with poor yields. In certain cases these compounds are also very unstable.

According to the present invention it is possible to produce in good yields thiazoles from raw materials which are easily obtainable. The process consists in allowing to react certain acidamides, which have at least one hydrogen atom in the amido group, with α-halogen-oxo-compounds and phosphorus pentasulfide. When compounds are used which are monosubstituted in the amido group, the thiazoles are obtained in the form of thiazolium salts (with pentavalent nitrogen). This reaction may be represented by the following two equations depending whether one uses unsubstituted acidamides or such that are monosubstituted in the amido group.

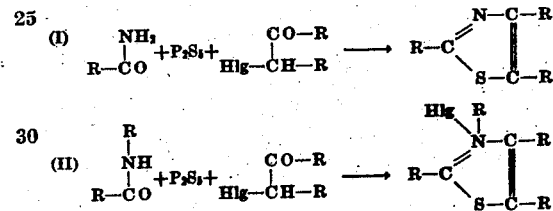

The radicals represented in the formulas by the letter "R" may be varied to a great extent. F. i. they may be of aliphatic, aromatic, hydroaromatic or heterocyclic nature; also substituted radicals may be used; furthermore R may represent hydrogen.

The invention is of special importance for the important case where it is desired to produce thioamides which are substituted in position 2. Hantzsch and his coworkers attempted to produce this type of thiazoles by the method above described. However, they did not attain their goal, since they did not succeed in isolating the thioformamide which they were trying to produce, an expectation which was not well founded in view of the unsuccessful experiments of A. W. v. Hofmann. Willstätter and Wirth (Ber. d. Dtsch. Chem. Ges. Vol. 42 (1909) p. 1908) were the first to produce thioformamide, but only under great difficulties. But even when using the modification suggested by Gabriel (Ber. d. Dtsch. Chem. Ges. 49 (1916) p. 1115) thioformamide still remains a compound obtainable in poor yields only.

It is very surprising that the mixture of acidamides, halogen-oxo-compounds and phosphorus pentasulfide reacts in the described manner, since it was to be expected that the keto- or aldehyde group of the oxo-compounds would react with the phosphorus pentasulfide (Houben, Die Methoden der organischen Chemie, 3rd edition, Vol. 3 (Leipzig 1930), p. 1230 last paragraph).

The reaction of the three compounds, namely acidamide, α-halogen-oxo-compound and phosphorus pentasulfide is carried out in the molten condition or in a suitable diluent or solvent. In many cases the reaction occurs spontaneously, in other cases it is necessary to warm up the reaction mixture. In most cases a distinct heat of reaction is noticeable, which may even become violent. In the latter case it is advisable to work with a solvent or diluent. Not suited for these purposes are such solvents which may partake in the reaction, especially those that may react with the phosphorus pentasulfide. Such are especially water, alcohols, ketones and other oxygen containing compounds.

To isolate the thus formed thiazoles use is made of their basic properties. F. i. the reaction mixture is poured into water and extracted with organic solvents, whereby non-basic products are taken up by the solvent, whereas the thiazoles remain in the aqueous solution as salts. From the aqueous solution they may be set free by adding an alkali, whereby the free thiazole is separated and can be easily obtained by extracting with organic solvents. Further purification may be achieved by vacuum distillation. Sometimes it is possible to obtain them in easily crystallizable salts, which property may be used for further purification. In cases where thiazolium salts are present in the reaction mixture (where an acidamide has been used which had been substituted in the amido group) it is necessary to avoid strong alkalis for the separation of these compounds, since thereby cleavage of the ring is easily produced.

A thiazolium salt which contains in position 3 a methyl group and in position 4 the oxethyl group (see Example 8) is vitamin B₁ (see Example 15).

Examples

1. A mixture of 5.9 parts of acetamide and 9.3 parts of chloroacetone are heated in a large bottle with 4.4 parts of phosphorus pentasulfide until violent reaction takes place under evolution of heat. The molten mass is treated with water, the acid aqueous solution is extracted with ether and then made alkaline with sodium hydroxide, 2,4 dimethylthiazol is separated which is purified by distillation. Boiling point 143°.

2. A mixture of 4,5 parts formamide and 9,3 parts chloracetone is mixed with 4,4 parts phosphorus pentasulfide in a similar way as in Example No. 1. The reaction sets in spontaneously. After completion of the reaction the molten mass is worked up as in Example 1. 4,3 parts of 4-methylthiazole are obtained, boiling point 131°.

3. To a mixture of 9,0 parts formamide, 9,3 parts chloracetone and 20 parts toluene are added 4,4 parts phosphorus pentasulfide. After slightly heating the mixture the temperature will go up on its own accord. The working up is carried out as above and 5,1 parts methylthiazole are obtained, boiling point 131°. The same product is obtained, if the equivalent quantity of bromacetone is used instead of the chloracetone.

4. The mixture of 9,0 parts formamide, 9,3 parts chloracetone, 100 parts ethyl ether and 4,4 parts phosphorus pentasulfide are boiled under reflux for 4 hours and then worked up as before. 4,1 parts of 4-methylthiazole, boiling point 131°, are obtaned.

5. 7,3 formethylamine, 9,3 parts chloracetone and 4,4 parts phosphorus pentasulfide are allowed to react under evolution of considerable heat. The resulting melt is dissolved in water, extracted with ether, neutralized with sodium carbonate (litmus) and evaporated to dryness in vacuo. The residue crystallizes. On recrystallization from absolute alcohol and ether, 8,0 parts of 3-ethyl-4-methyl-thiazoliumchloride are obtained as a very hydroscopic compound, which gives a gold salt of melting point 135° and a platinum salt, having a decomposition point 221°. This proved to be identical with the product obtained from 4-methyl-thiazole by the addition of ethyliodide followed by double decomposition with silver chloride, whereby 3-ethyl-4-methyl-thiazolium-chloride was formed.

6. 10,1 parts formylbutylamine, 9,3 parts chloracetone and 4,4 parts phosphorus pentasulfide are warmed up to about 70°. The reaction sets in and, after cooling, the mixture is treated as stated in Example 5. The compound obtained by evaporating of the absolute alcoholic solution does not crystallize, but it may be easily characterized by formation of double salts.

Platinum salt $(C_8H_{14}NS)_2PtCl_6$, decomposition point 235°; gold salt $C_8H_{14}NS.AuCl_4$, melting point 83°; mercuric chloride salt, melting point 179°.

7. 13,5 parts formylbenzylamine, 9,3 parts chloracetone and 4,4 parts phosphorus pentasulfide react violently. The reaction mixture is treated as in Example 5. The residue from the alcoholic solution crystallizes. After several re-crystallisations from absolute alcohol, 11 parts of 3-benzyl-4-methylthiazoliumchloride are obtained, melting point 193°.

8. A mixture of 13,7 parts of 3-acetyl-3-chlorpropanol (1), 9,0 parts formamide and 50 parts toluene is treated with 4,4 parts phosphorus pentasulfide and heated to the boiling point of toluene. The mixture is poured into water and the aqueous solution, after separation of the toluene layer, is freed from non-basic impurities by extracting with ether. After saturation with potassium carbonate, the solution is extracted with ether. After drying the ether solution is evaporated in vacuo. The 4-methyl-5-β-oxy-ethylthiazole is purified as the well crystallizing picrate, melting point 162°.

9. 21,3 parts α-brompropiophenone, 4,4 parts phosphorus pentasulfide, 9,0 parts formamide and 50 parts toluene are heated slowly, until a violent reaction sets in. After heating for 10 minutes longer under reflux, the reaction is complete. The resulting syrupy mass is dissolved in water, the toluene layer is separated and the aqueous solution is extracted with ether several times. After making alkaline, the aqueous solution is extracted with ether. After evaporation of the ether the residue distills at 278° under atmospheric pressure. The product, obtained in a yield of 40% of Theory, is according to the analysis 4-phenyl-5-methylthiazole.

10. 14,1 parts formyl-hexahydrobenzylamine (Bpt. 11 168—173°, melting point 45°), 9,3 parts chloracetone, 5,0 parts of phosphorus pentasulfide and 40 parts toluene are heated on a steambath until an exothermic reaction sets in. For completion the toluene solution is heated another 10 minutes under reflux. The resulting greenish colored oil is dissolved in water, the toluene is separated and the aqueous solution is extracted twice with ether. The solution is then neutralized to litmus with potassium hydroxide and evaporated in vacuo. The residue is taken up in absolute alcohol and, on evaporation, 19,6 parts of 3-hexahydrobenzyl-4-methyl-thiazolechloride are obtained.

The compound was characterized by the following double salts: Gold salt, $C_{11}H_{18}NSCl.AuCl_3$, melting point 89°; platinum salt $$(C_{11}H_{18}NSCl)_2PtCl_4,$$

melting point 224°; mercuric salt, colorless leaflets, melting point 165°.

11. 10,1 parts isovaleric acid amide, 9,3 parts chloroacetone, 5 parts phosphorus pentasulfide and 30 parts toluene are heated to 70°. A spontaneous rise of temperature to 110° sets in. For completion, the reaction mixture is heated 5 minutes longer under reflux. The resulting viscous mass is dissolved in dilute hydrochloric acid. After separating from the toluene, the solution is extracted with ether several times. After making alkaline, the solution is extracted several times with petroleum ether. After evaporation of the petroleum ether an oil remains which boils under atmospheric pressure at 189° and yields 6,4 parts of 2-isobutyl-4-methylthiazole.

12. 19,9 parts crude, undistilled phenylbromacetaldehyde (E. Fischer, Ber. d. Dtsch. Chem. Ges. 29 (1896), p. 213). 8 parts formamide, 5 parts phosphorus pentasulfide, 40 parts toluene are heated on a water bath until reaction starts. After completion, a viscous oil separates which is treated with dilute hydrochloric acid. The acid solution is separated from the toluene and resinous matter, and is extracted several times with ether. After making alkaline with sodium hydroxide, the solution is again extracted with ether. For purification the ether extract is mixed with dilute hydrochloric acid and the separated acid solution is again made alkaline with sodium hydroxide and steam distilled. The resulting 5-phenylthiazole distills over as a colorless oil which soon crystallizes, melting point 44°. It yields a picrate, melting point 139° and a platinum salt, decomposition point 281°.

13. 7,6 parts water free chloracetaldehyde, 9,0 parts formamide, 5,0 parts phosphorus pentasulfide and 10 parts toluene are heated on a steam bath until reaction sets in. After completion, a red brown oil separates which is taken up in dilute hydrochloric acid. The undissolved resins are removed and the acid aqueous solution is extracted several times with ether. After making alkaline with sodium hydroxide it is again extracted with ether. The ether solution is evaporated carefully and the residue distilled. The thiazole which boils at 117° C., is characterized by its picrate, melting at 159° and its gold salt, decomposing at 252°.

14. 20,7 parts 3,4 - methylenedioxyphenyl - N - formylisopropyl-amine, 9,3 parts chloracetone, 6,0 parts phosphorus pentasulfide and 30 parts toluene are heated on a steam bath, until the exothermic reaction starts. After its completion it is heated another 10 minutes. The reaction product, a yellowish viscous oil, is dissolved in dilute hydrochloric acid. After separation, from the toluene, the solution is extracted several times with ether and filtered. The clear solution is neutralized to litmus with potassium hydroxide and again extracted with ether. The aqueous solution is then evaporated to dryness in vacuo. The residue is taken up in absolute alcohol. On evaporation of the alcohol a crystalline residue remains, which is purified by redissolving in absolute alcohol and precipitating with a little alcoholic hydrochloric acid and ether. The melting point is about 217°. The compound is 3-(3',4'-methylenedioxy-phenyl-isopropyl) 4 - methyl - thiazolium - chloride. Yield: 54% of theory.

15. 1,66 g. of 2-methyl-4-amino-5-formylaminomethylpyrimidine, melting point 225°, are heated on an oil bath with 1,97 g. of 3-acetyl-4-chlor-1-acetoxy-propane and 0,5 g. phosphorus pentasulfide for 15 minutes to 120°. After cooling, the reaction mixture is dissolved in water, made acid to congo with dilute hydrochloric acid and extracted with ether. The aqueous solution is then made neutral to congo by the addition of caustic soda and evaporated to dryness in vacuo. The residue is extracted by boiling with absolute alcohol, inorganic salts remain undissolved and are filtered off. The solution is evaporated to dryness. The residue shows, on pharmacological testing, an antineuritic action.

I claim as my invention:

1. A process for the manufacture of thiazoles consisting in permitting to react simultaneously an acidamide, having at least one hydrogen atom in the amido group, an α-halogen-oxocompound and phosphorus pentasulfide.

2. A process for the manufacture of thiazoles consisting in permitting to react simultaneously an acidamide, having at least one hydrogen atom in the amido group, an α-halogen-oxocompound and phosphorus pentasulfide in presence of an organic solvent.

3. A process for the manufacture of thiazoles consisting in allowing to react simultaneously an acid-amide, an α-halogen-ketone and phosphorus pentasulfide.

4. A process for the manufacture of thiazoles consisting in allowing to react simultaneously formamide, monosubstituted in the amido group, an α-halogen-oxocompound and phosphorus pentasulfide.

5. A process for the manufacture of thiazoles consisting in allowing to react simultaneously 2-methyl-4-amino- 5 -formyl-aminomethyl-pyrimidine, 3 - aceto - 3 - chloro-1-acetoxypropane and phosphorus pentasulfide.

OTTO HROMATKA.